July 8, 1958

J. G. COVITT 2,841,838

CORE LOCATING DEVICE AND METHOD OF ASSEMBLING CORES

Filed June 8, 1956

Inventor:
Jack G. Covitt
Paul O. Pippel
Atty.

July 8, 1958 — J. G. COVITT — 2,841,838
CORE LOCATING DEVICE AND METHOD OF ASSEMBLING CORES
Filed June 8, 1956 — 2 Sheets-Sheet 2
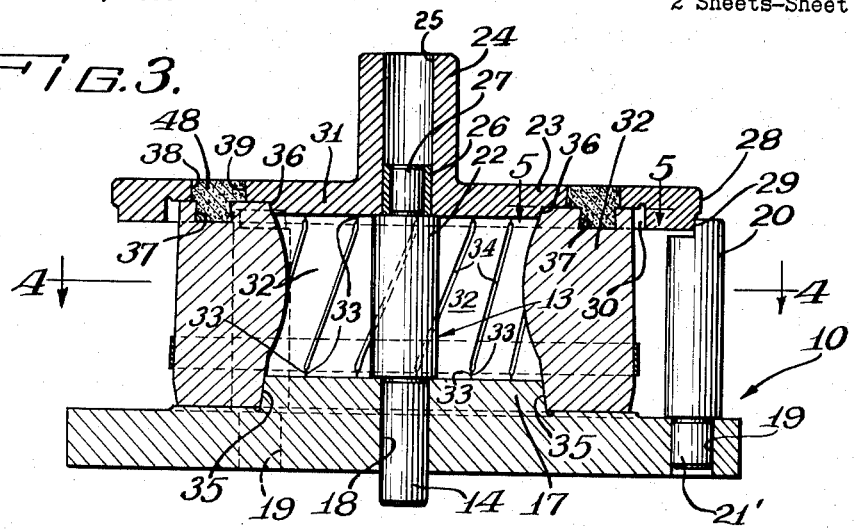
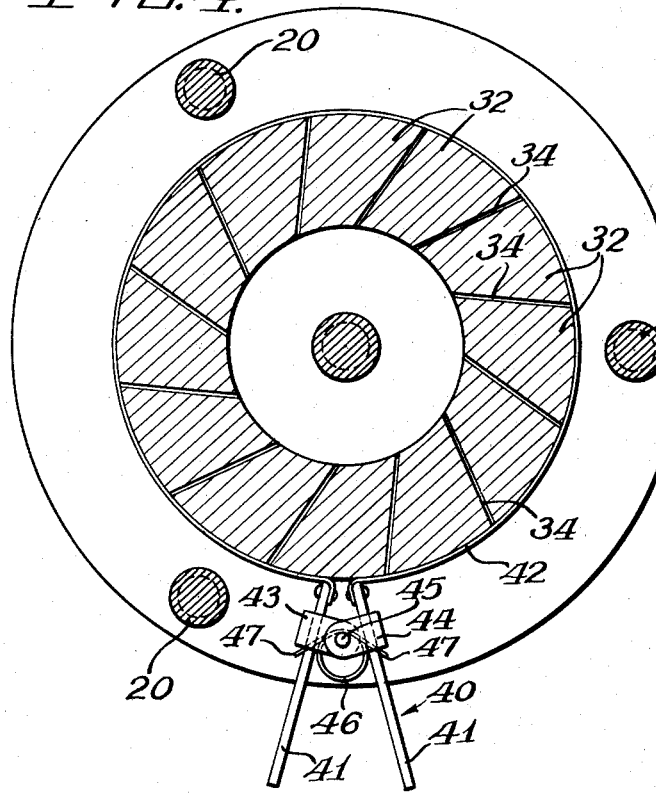
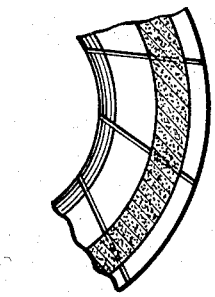
Inventor:
Jack G. Covitt
Paul O. Pippel
Atty.

United States Patent Office 2,841,838
Patented July 8, 1958

2,841,838

CORE LOCATING DEVICE AND METHOD OF ASSEMBLING CORES

Jack G. Covitt, Fort Wayne, Ind., assignor to International Harvester Company, a corporation of New Jersey Application June 8, 1956, Serial No. 590,217

6 Claims. (Cl. 22—31)

This invention relates to a device for locating cores utilized in connection with foundry practices. More specifically, the invention relates to a device or fixture for locating cores and a method for assembling a plurality of cores. In the foundry practice of manufacturing turbines and reactors, it is necessary to accurately assemble a plurality of cores of plaster or similar ceramic composition into a unitary core structure which is placed into the mold prior to a centrifugal casting operation. In order to secure uniformity of thickness of the blades of the reactor or turbine, it is extremely desirable that the individual cores be properly positioned with respect to one another. Great care therefore, must be taken in the assembly of the cores so that they are initially positioned in precise relation and will remain in this position during their insertion into the mold assembly. It is a prime object of this invention therefore, to provide an improved device for locating cores and an improved method of connecting the cores in assembled position.

Still another object is to provide an improved core assembly fixture comprising upper and lower locating elements adapted to be engaged by individual cores for locating the cores in circumferentially adjacent relation.

A still further object is to provide a locating fixture for locating a plurality of cores, the fixture comprising a table rotatably positioned on a base, the said table also including a locating projection adapted to circumferentially locate a plurality of cores prior to their connection into an assembled unit.

A still further object is to provide a fixture for assembling cores, said fixture being adapted to be quickly assembled and disassembled during the core locating and connecting operation.

Still another object is to provide an improved core assembly fixture including upper and lower locating elements adapted to be engaged by the inner surfaces of a core whereby a plurality of cores may be accurately assembled in circumferentially disposed relation, the fixture including a resilient means adapted to engage the core elements and to resiliently urge them into abutting relation with respect to the locating members of the core assembly fixture.

A still further object is to provide an improved method of assembling a plurality of individual cores, the said cores having upper dovetail recesses which, upon the positioning of the cores, with respect to a locating fixture are aligned into a substantially continuous annular recess, the process, after the locating of the cores, including the filling of the recess with a ceramic hardenable mixture which provides a connecting ring connecting each individual core to provide a unitary assembled core mass.

These and other objects will become further apparent from a reading of the description when examined in connection with the accompanying sheets of drawings.

In the drawings:

Figure 3 is a cross-sectional view through a core assembly fixture, the view being taken along the line 3—3 of Figure 2;

Figure 4 is a cross-sectional view taken substantially along the line 4—4 of Figure 3; and Figure 5 is a fragmentary sectional view taken substantially along the line 5—5 of Figure 3.

Figure 1:
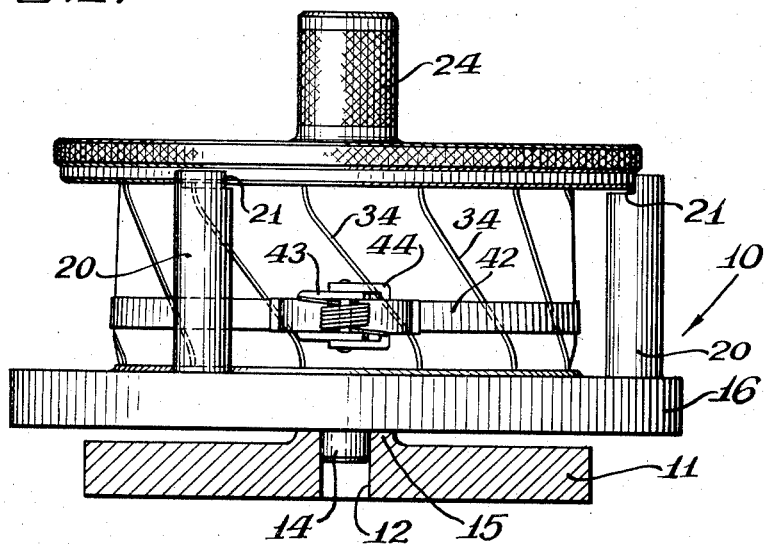
Figure 1 is a side elevational view of a core assembly fixture having a plurality of individual cores mounted thereon, the said fixture including a base member shown in section.
Figure 2:
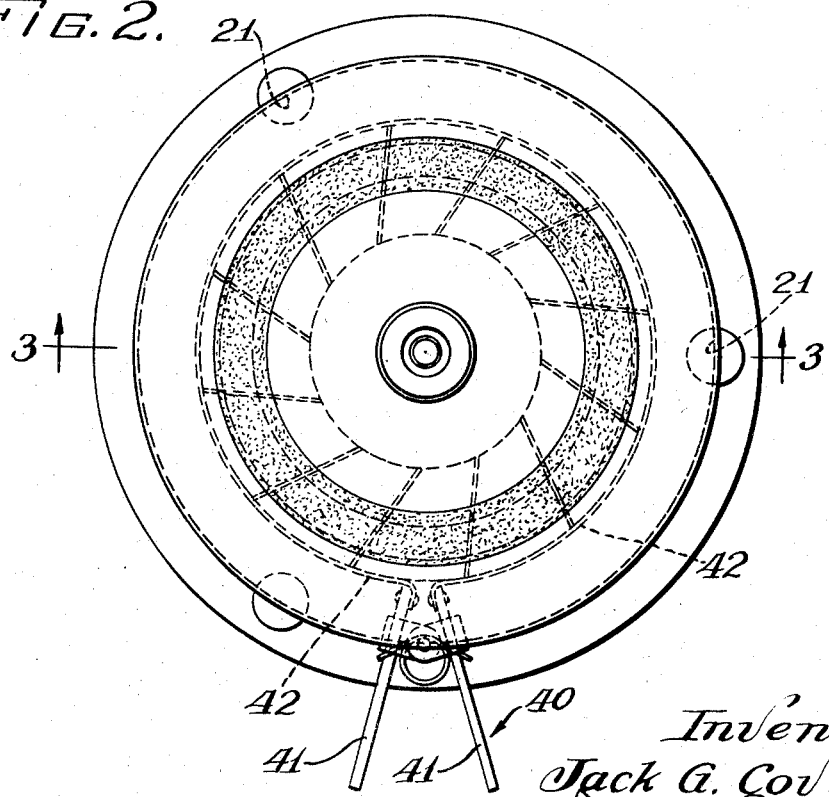
Figure 2 is a plan view of the core assembly fixture shown in Figure 1.

Referring now particularly to Figures 1 and 3, a core assembly fixture or device is generally designated by the reference character 10. The device 10 comprises a base 11 having a centrally disposed vertical bore 12. A spindle, generally designated at 13, is supported on the base 11, the said spindle 13 including a lower stub 14 rotatably mounted in the bore 12. The base 11 is also provided with an upwardly extending boss 15 on which a table 16 is rotatably positioned. The table 16 comprises an upwardly extending annular locating projection and a bore 18 extends through the table 16 and through the projection 17.

The table 16 is also provided with a plurality of circumferentially based bores disposed laterally outwardly of the locating projection 17. Each of the bores 19 removably supports a pin 20 having at its lower end a stub portion 21' disposed within the bore 19. Each pin 20 is provided at its upper end with an undercut shoulder 21.

The spindle 13 is provided with an enlarged diameter body 22 which is seated upon the table 17. The spindle 13 supports a locating plate 23 having an upwardly extending boss 24 suitably knurled around its outer surface whereby it may be easily gripped by the fingers of an operator. The boss 24 and plate 23 are provided with a central bore 25 having a sleeve 26 positioned therein. The sleeve 26 mates with a reduced diameter portion 27 of the spindle 13.

A ring 28 has an outer peripheral edge 29 which is seated upon the undercut shoulders 21 of the pins 20. The ring 28 is recessed as indicated at 30. The plate 23 includes a downwardly extending annular projection which provides a locating means or member 31. As indicated a plurality of ceramic core elements 32 are seated upon the table 17. The core elements 32 herein shown may be of a conventional type having ceramic properties such as are found in plaster or other mixes recommended for cores used in connection with foundry operations in the manufacture of turbines used in torque converters, etc. Each individual ceramic core element 32 includes, as best shown in Figure 3, at its upper and lower ends, abutting edges 33. Thus, the core elements abut each other at their upper ends and they are so recessed or shaped that in adjacent relation they provide diagonally extending slots 34. Each core 32 is provided with a lower inner edge 35 and an upper inner edge 36. The edges 35 and 36 are locating edges, in that they are in abutment with the locating projections 17 and 31. Each core also includes at its upper end a dovetail recess 37. The dovetail recesses 37, upon proper positioning of the cores on the fixture, actually provide a substantially continuous single annular recess. The ring 28 is provided with an inner peripheral edge 38 and the plate 23 is provided with an outer peripheral edge 39. The peripheral edges 38 and 39 as best shown in Figure 3 are suitably spaced to provide a suitable access to the substantially continuous recess formed by the aligned dovetail recesses 37.

The individual core elements 32 are suitably held against the locating projections 31 and 17 by means of a spring clamp generally designated at 40. The spring clamp 40 includes a pair of handles 41 which are suitably connected to a band 42. The band 42 encircles the assembled cores. Brackets 43 and 44 are respectively connected to the handles 41, and they are in relative hinging relation by means of a hinge pin 45. A spring 46 includes spring arms 47 normally urging the handles 41 in a direction away from each other thereby causing tension upon the band 42 which in turn urges the individual core elements in resilient engagement with the locating projection.

In the location of the core elements, assembly of the fixture may vary, but generally the table 16 is rotatably positioned on the base 11. The spindle 13 is in position and the pins 20 may be removed at this time. The individual cores may then be placed upon the table with their lower edges 35 in abutting relation with respect to the projection 17. The pins 20 may then be placed in position and the spring clamp 40 may be placed around the lower ends of the cores as indicated thus urging them into engagement with the locating projection 17. The plate 23 is now placed in position on the spindle and the locating projection 31 is engaged by the upper edges 36 of the individual cores. The ring 28 may then be placed in position, the said ring being supported on the pins 20 and also having portions of the said ring 28 engaging upper portions of the cores 32 to further support them in position. By virtue of the annular space left between the ring and the plate, the cores can now be connected together to provide a connected unitary single core structure which can be readily inserted into a mold for casting. Thus, the operator pours a hardenable mixture into the dovetail recesses forming the substantially continuous passage and the hardenable material hardens into a solid ring 48 connecting each of the individual cores to firmly hold them together in the proper located and assembled position which is accomplished by the locating projections of the fixture. It is noted that the edges 38 and 39 are tapered to provide suitable draft so that the plate 23 and the ring 28 can easily be removed from the hardened ring 48. Thus, it is a simple matter to assemble the cores with relation to the core locating fixture and it is also a simple matter to remove the parts when the ring 48 has hardened sufficiently so that the cores are permanently connected in the desired position.

The spring clamp 40 assures that the cores are all placed tightly in abutting relation with respect to the locating projections so that they are, in fact, properly assembled. After the plate 23 and ring 28 have been removed it is a simple matter to loosen up the spring clamp 40 and to remove the same from the unitary mold structure which has been formed by the interconnected individual core elements.

It is thus apparent that an improved core fixture, core assembly, and locating fixture has been described and that an improved method for assembling individual cores into a unitary structure has been described. It must be understood that the assembly operation of the individual elements of the assembly fixture may be varied. It also must be realized that changes and modifications may be made in the structure which do not depart from the spirit of the invention as disclosed and as defined in the appended claims.

What is claimed is:

1. A core assembly fixture comprising a base having a central bore, a table having a cylindrical upwardly extending lower locating projection, said table and projection including a centrally located bore, a plurality of upright pins circumferentially spaced and removably connected to said table, each of said pins having an undercut shoulder, said locating projection being adapted to engage and locate at their lower ends a plurality of core elements in circumferentially disposed and adjacent relation, each of said core elements having at its upper end a dovetail recess, a ring having its outer peripheral edge portion seated upon the shoulders of said pins, said ring having an inner peripheral edge portion engaging said upper edges of said core elements, an annular locating plate having a central bore, said locating plate having a cylindrical downwardly extending upper locating projection adapted to be engaged by the upper ends of said core elements, said locating plate having an outer peripheral edge spaced from the inner peripheral edge of said ring to provide an annular recess in registry with the dovetail recesses of said core elements, and a spindle having a central portion supported on said table for supporting said locating plate, said spindle including an upper portion engaging the bore of said locating plate, and a lower portion extending through the bore of said table and into the bore of said base whereby the table is rotatably supported on said base.

2. A core assembly fixture comprising a base having a central bore, a table having a cylindrical upwardly extending lower locating projection, said table and projection including a centrally located bore, a plurality of upright pins circumferentially spaced and supported on said table, each of said pins having an undercut shoulder, said locating projection being adapted to engage and locate at their lower ends a plurality of core elements in circumferentially disposed and adjacent relation, each of said core elements having at its upper end a recess, a ring having its outer peripheral edge portion seated upon the shoulders of said pins, said ring having an inner peripheral edge portion engaging said upper edges of said core elements, an annular locating plate having a central bore, said locating plate having a cylindrical downwardly extending upper locating projection adapted to be engaged by the upper ends of said core elements, said locating plate having an outer peripheral edge spaced from the inner peripheral edge of said ring to provide an annular recess in registry with the recesses of said core elements, and a spindle having a central portion supported on said table for supporting said locating plate, said spindle including an upper portion engaging the bore of said locating plate, and a lower portion extending through the bore of said table and into the bore of said base whereby the table is rotatably supported on said base.

3. A core assembly fixture comprising a base having a central bore, a table having an upwardly extending lower locating projection, a plurality of upright pins circumferentially spaced on said table, each of said pins having an undercut shoulder, said locating projection being adapted to engage and locate at their lower ends a plurality of core elements in circumferentially disposed and adjacent relation, each of said core elements having at its upper end a recess, a ring having its outer peripheral edge portion seated upon the shoulders of said pins, said ring having an inner peripheral edge portion engaging said upper edges of said core elements, a locating plate, said locating plate having a cylindrical downwardly extending upper locating projection adapted to be engaged by the upper end of said core elements, said locating plate having an outer peripheral edge spaced from the inner peripheral edge of said ring to provide an annular recess in registry with the recesses of said core elements, means connecting said table and said plate, and means rotatably connecting said table to said base.

4. A method of assembling cores having edge portions with recesses formed therein, comprising locating said cores in circumferentially disposed and adjacent relation by abutting the upper end lower inner edges of said cores against a locating fixture whereby said recesses are in alignment to provide an annular substantially continuous single recess, and introducing a hardenable mixture into said recess which upon hardening forms a connector ring connecting the cores as a unitary assembly.

5. A method of assembling cores having edge portions with recesses formed therein, comprising locating said cores in circumferentially disposed and adjacent relation whereby said recesses are in alignment to provide an annular substantially continuous single recess, and introducing a hardenable mixture into said recess which upon hardening forms a connector ring connecting the cores as a unitary assembly.

6. A method of assemblling cores, each having an upper surface with a dovetail recess formed therein, comprising locating said cores in circumferentially disposed and adjacent relation whereby said recesses are in alignment to provide an annular substantially continuous single recess, and introducing a hardenable mixture into said recess which upon hardening forms a dovetail connector ring connecting the cores as a unitary assembly.

References Cited in the file of this patent

UNITED STATES PATENTS

| | | |
|---|---|---|
| 2,479,039 | Cronstedt | Aug. 16, 1949 |
| 2,663,058 | Lentz et al. | Dec. 22, 1953 |
| 2,741,817 | Wilkins | Apr. 17, 1956 |